3,539,632
DIETHYLMETHYL(2-PHENYLALLYL) AMMONIUM IODIDE
Leo R. Morris, Midland, Mich., assignor to The Dow Chemical Company, Midland, Mich., a corporation of Delaware
No Drawing. Filed July 22, 1968, Ser. No. 746,310
Int. Cl. C07c 87/30
U.S. Cl. 260—567.6          1 Claim

ABSTRACT OF THE DISCLOSURE

The present disclosure is directed to the compound diethylmethyl(2-phenylallyl)ammonium iodide, its method of preparation as well as its use as a selective herbicide.

SUMMARY OF THE INVENTION

The present invention relates to the compound diethylmethyl(2-phenylallyl)ammonium iodide which can be represented by the formula

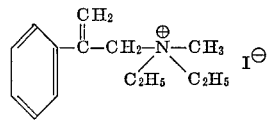

The compound of the present invention is a non-hygroscopic powder, very soluble in water and appreciably soluble in alcohols and acetone, while being essentially insoluble in carbon tetrachloride and petroleum ether. This compound finds use as a selective herbicide for yellow foxtail.

The diethylmethyl(2-phenylallyl)ammonium iodide of the invention may be prepared by the reaction of diethyl(2-phenylallyl)amine and methyl iodide in the presence of a solvent such as acetone or other inert organic solvent such as methyl alcohol, or methyl ethyl ketone. The amount of the reactants to be employed is not critical, some of the product being formed when employing any proportions. The reaction consumes the reactants, however, in the ratio of one mole of the diethyl(2-phenylallyl)amine per mole of the methyl iodide and the employment of such proportions is preferred.

In carrying out this reaction, the reactants and solvent are contacted and maintained together in any convenient fashion. The reaction is maintained under ambient atmospheric conditions of temperature and pressure, with stirring, for a period of about 18 hours. The solvent is removed and the reaction product mixed with petroleum ether and filtered to recover the solid product which is washed with additional petroleum ether and dried.

DESCRIPTION OF SOME PREFERRED EMBODIMENTS

The following example illustrates the present invention and the manner by which it can be practiced but, as such, should not be construed as a limitation upon the overall scope of the same.

EXAMPLE 1

Diethylmethyl(2-phenylallyl)ammonium iodide

A solution is repared in a flask containing 2.0 grams (0.01 mole) of diethyl(2-phenylallyl)amine, 2.4 grams (0.01 mole) of methyl iodide and 10 milliliters of acetone. This solution is maintained under conditions of ambient atmospheric temperature and pressure for 18 hours with stirring. The solvent is then removed by vacuum separation employing an aspirator. A thick yellow residue remains and this residue is triturated with petroleum ether with agitation, until crystallization is complete. The solid diethylmethyl(2-phenylallyl)ammonium iodide product is then recovered by filtration and is washed with petroleum ether and dried in vacuo for 3 hours. The product is obtained in a yield of 3.5 grams and has a melting point of 90°–92° C. and a molecular weight of 331.

The compound of the present invention is useful as a selective herbicide for the post-emergence control of yellow foxtail. For such use, the compound can be employed in an unmodified form or dispersed on a finely divided solid as a dust. Such mixtures can also be dispersed in water and the resulting aqueous suspension employed as a spray. In other procedures, the products can be employed as active constituents in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions.

The particular combination or composition to be employed will be guided by the particular results to be accomplished and is readily determined by those skilled in the art.

Excellent results are obtained with methods employing and compositions containing herbicidal amounts or concentrations of the novel compound of this invention. Effective post-emergence growth control of yellow foxtail may be achieved by the administration of a composition containing from about 2,000 to about 20,000 parts by weight of the novel compound per million parts of the ultimate composition.

In a representative operation, an aqueous spray composition containing 5,000 parts by weight of diethylmethyl(2-phenylallyl)ammonium iodide, as the only active agent, per million parts by weight of ultimate mixture is prepared. This composition is employed in post-emergent applications for the selective control of yellow foxtail. The composition is applied as a foliage spray to a mixed plot of good soil supporting stands of white winter wheat, radish, corn, yellow foxtail and soybean. At the time of the spray application, the plants are all from 2 to 4 inches in height. The treatment is carried out with conventional spraying equipment, the application being made to the point of run-off. Similar mixed plots are left untreated to serve as controls.

After about two weeks, the plots are examined to ascertain the percent kill and control of the growth of yellow foxtail. In the treated plots, there is found a 100 percent kill and control of yellow foxtail while the other plant are unaffected. The control plots are found to support abundant stands of vigorously growing plants including yellow foxtail.

PREPARATION OF STARTING MATERIALS

The diethyl(2-phenylallyl)amine starting material may be prepared by the bromination of 2-phenyl-allyl alcohol to 2-phenylallylbromide with HBr followed by the amination of this product with an excess of diethylamine at 100° C. This preparation is further described by G. Benoit and R. Herzog in Bull. Sci. Pharmacol., vol. 42, pages 34–43 and 102–109 (1935).

What is claimed is:
1. Diethylmethyl(2-phenylallyl)ammonium iodide.

References Cited

Cowley et al.: J. Chem. Soc., London, pp. 1228–31 (1961).

LEON ZITVER, Primary Examiner
G. A. SCHWARTZ, Assistant Examiner

U.S. Cl. X.R.
71—121